(12) United States Patent
Seo et al.

(10) Patent No.: US 9,926,448 B2
(45) Date of Patent: Mar. 27, 2018

(54) ASPHALT MODIFIER AND ASPHALT COMPOSITION COMPRISING THE SAME

(71) Applicant: LG Chem, Ltd., Seoul (KR)

(72) Inventors: You Seok Seo, Daejeon (KR); Ji Myeong Lee, Daejeon (KR); Tae Jung Kim, Daejeon (KR); Chun Hwa Lee, Daejeon (KR)

(73) Assignee: LG Chem, Ltd. (KR)

( * ) Notice: Subject to any disclaimer, the term of this patent is extended or adjusted under 35 U.S.C. 154(b) by 293 days.

(21) Appl. No.: 14/905,700

(22) PCT Filed: Jul. 3, 2015

(86) PCT No.: PCT/KR2015/006884
§ 371 (c)(1),
(2) Date: Jan. 15, 2016

(87) PCT Pub. No.: WO2016/072584
PCT Pub. Date: May 12, 2016

(65) Prior Publication Data
US 2016/0326371 A1 Nov. 10, 2016

(30) Foreign Application Priority Data

Nov. 4, 2014 (KR) .................. 10-2014-0152271

(51) Int. Cl.
*C08L 95/00* (2006.01)
*C08F 297/04* (2006.01)
*C08L 53/02* (2006.01)

(52) U.S. Cl.
CPC ............ *C08L 95/00* (2013.01); *C08F 297/04* (2013.01); *C08F 297/044* (2013.01); *C08L 53/02* (2013.01); *C08L 2205/02* (2013.01); *C08L 2555/84* (2013.01)

(58) Field of Classification Search
CPC ............................ C08L 95/00; C08F 29/044
See application file for complete search history.

(56) References Cited

U.S. PATENT DOCUMENTS

| 6,964,996 | B1 | 11/2005 | Lee et al. |
| 2005/0004273 | A1 | 1/2005 | Chun et al. |
| 2006/0229390 | A1 | 10/2006 | Chun et al. |

| 2008/0275183 | A1* | 11/2008 | Kluttz ............... C08F 297/04 525/54.5 |
| 2012/0245295 | A1 | 9/2012 | Lee et al. |
| 2014/0076473 | A1 | 3/2014 | Abad et al. |

FOREIGN PATENT DOCUMENTS

| CN | 1620481 A | 5/2005 |
| CN | 101675114 A | 3/2010 |
| CN | 102597032 A | 7/2012 |
| JP | H03281651 A | 12/1991 |
| JP | 2001240636 A | 9/2001 |
| JP | 2003073433 A | 3/2003 |
| JP | 2008106149 A | 5/2008 |
| JP | 2010526180 A | 7/2010 |
| JP | 5242051 B2 | 7/2013 |
| KR | 20040032488 A | 4/2004 |
| KR | 20070030829 A | 3/2007 |
| KR | 100711270 B1 | 4/2007 |
| KR | 20130030424 A | 3/2013 |
| KR | 101395523 B1 | 5/2014 |
| KR | 101428660 B1 | 8/2014 |
| KR | 101455590 B1 | 10/2014 |
| WO | 2005123834 A1 | 12/2005 |
| WO | 2008137394 A1 | 11/2008 |

OTHER PUBLICATIONS

International Search Report for Application No. PCT/KR2015/006884 dated Sep. 30, 2015.
Chinese Search Report for Application No. CN201580001517.5 dated May 15, 2017.
Extended Search Report from European Application No. 15819777.2, dated Sep. 23, 2016.

* cited by examiner

*Primary Examiner* — Christopher M Rodd
(74) *Attorney, Agent, or Firm* — Lerner, David, Littenberg, Krumholz & Mentlik, LLP

(57) ABSTRACT

Provided are an asphalt modifier comprising a vinyl aromatic hydrocarbon-conjugated diene block copolymer of Formula 1 and an asphalt composition comprising the asphalt modifier.

$$(A-B-C)_n-D \qquad [\text{Formula 1}]$$

(where A, B, C, D, and n are the same as defined in the specification)

The asphalt modifier comprising the vinyl aromatic hydrocarbon-conjugated diene block copolymer of Formula 1 may improve low-temperature and high-temperature physical properties when used in the asphalt composition, and since the asphalt modifier may also reduce dissolution time by increasing a dissolution rate, storage stability of the asphalt composition may be improved.

20 Claims, 1 Drawing Sheet

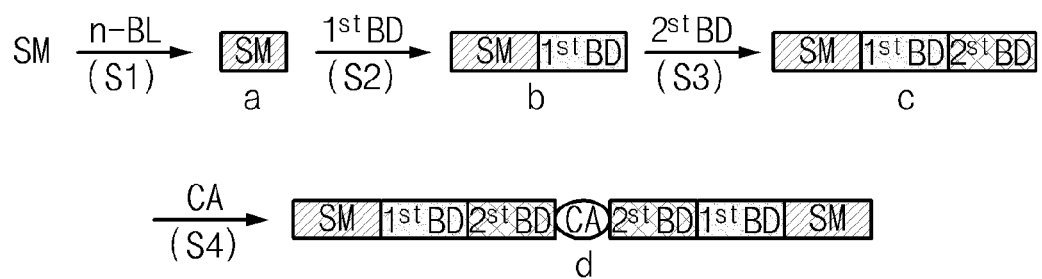

ASPHALT MODIFIER AND ASPHALT COMPOSITION COMPRISING THE SAME

CROSS-REFERENCE TO RELATED APPLICATION

This application is a national phase entry under 35 U.S.C. § 371 of International Application No. PCT/KR2015/006884, filed Jul. 3, 2015, which claims priority to Korean Application No. 10-2014-0152271, filed Nov. 4, 2014, the disclosures of which are incorporated herein by reference.

TECHNICAL FIELD

The present invention relates to an asphalt modifier and an asphalt composition comprising the same.

BACKGROUND ART

Asphalt is a residue which is obtained after most of volatile oils in components of crude oil are evaporated, wherein the asphalt has physical properties in which it maintains a liquid or semi-solid state having high viscosity at high temperature but it hardens at room temperature or less. Also, since asphalt has characteristics in which plasticity is good, water resistance, electrical insulation, and adhesiveness are high, and chemical stability is excellent, asphalt has been widely used in construction materials such as a paving material or a waterproof material. However, asphalt has limitations in that plastic deformation occurs during use when the asphalt is exposed to high temperatures for a prolonged period of time and cracking occurs at low temperatures due to an external impact.

In order to address the above limitations, research to improve the physical properties of asphalt by adding various polymers has currently been conducted.

For example, there is a method of using a vinyl aromatic hydrocarbon-conjugated diene block copolymer, such as a styrene-butadiene-styrene (SBS) block copolymer, as a modifier or impact modifier for improving physical properties of an asphalt composition.

In general, in order to use the SBS block copolymer in the asphalt composition, compatibility with asphalt is basically and essentially required. In a case in which the SBS block copolymer has excellent compatibility with asphalt, processing time may be reduced and the effect of improving the physical properties of asphalt may be high.

However, while advancement of oil refining facilities has been continuously made due to an increase in oil prices and energy saving policy, the amount of asphaltene in asphalt, as a refining byproduct, has been increased. Since the asphaltene, as an aggregate of aromatic hydrocarbons, includes a large amount of polar functional groups at the ends thereof, the asphaltene has very low compatibility with the SBS block copolymer having no functional group. Thus, processing time of the asphalt composition may not only be significantly increased, but degradation of the quality of the asphalt, for example, a decrease in elasticity of the modified asphalt composition, may also occur.

With respect to the above limitations, a method of controlling molecular weight of the SBS block copolymer or changing a molecular microstructure of the block copolymer so as to provide a coupling effect, or a method of adding an additive, such as oil, as a processing aid, has been proposed. However, since a modification method for each asphalt with quality deviations must be developed even if the above methods are used, the above methods may not be the ultimate solution.

Thus, there is an urgent need to develop an SBS block copolymer as an asphalt modifier having excellent compatibility with asphalt.

DISCLOSURE OF THE INVENTION

Technical Problem

The present invention provides an asphalt modifier which may improve low-temperature and high-temperature physical properties of an asphalt composition and may increase a dissolution rate, and a preparation method thereof.

The present invention also provides an asphalt composition including the above-described asphalt modifier.

Technical Solution

According to an aspect of the present invention, there is provided an asphalt modifier comprising a vinyl aromatic hydrocarbon-conjugated diene block copolymer of Formula 1:

(A-B-C)$_n$-D    [Formula 1]

in Formula 1,

A represents a vinyl aromatic hydrocarbon block having a peak molecular weight (Mp) of 10,000 g/mol to 35,000 g/mol, B represents a first conjugated diene block having an Mp of 16,000 g/mol to 30,000 g/mol and an amount of vinyl of 10 wt % to 20 wt %, C represents a second conjugated diene block having an Mp of 10,000 g/mol to 24,000 g/mol and an amount of vinyl of greater than 20 wt % and equal to or less than 34 wt %, D represents a residual group of a coupling agent, and n is an integer between 2 and 4.

According to another aspect of the present invention, there is provided a method for preparing an asphalt modifier comprising the vinyl aromatic hydrocarbon-conjugated diene block copolymer of Formula 1, the method comprising: preparing a first mixed solution comprising a polymer for forming a vinyl aromatic hydrocarbon block by primary polymerization of a vinyl aromatic hydrocarbon-based monomer using a polymerization initiator in a hydrocarbon-based solvent; preparing a second mixed solution comprising a vinyl aromatic hydrocarbon-first conjugated diene diblock copolymer by adding a conjugated diene to the first mixed solution and performing secondary polymerization; preparing a third mixed solution comprising a vinyl aromatic hydrocarbon-first conjugated diene-second conjugated diene triblock copolymer by adding a Lewis base and a conjugated diene to the second mixed solution and performing third polymerization; and performing a coupling reaction by adding a coupling agent to the third mixed solution.

According to another aspect of the present invention, there is provided an asphalt composition including the above-described asphalt modifier.

Advantageous Effects

Since a vinyl aromatic hydrocarbon-conjugated diene block copolymer according to the present invention may include heterogeneous butadiene blocks having different amounts of vinyl and peak molecular weights (Mps) in the polymer, the vinyl aromatic hydrocarbon-conjugated diene block copolymer may improve low-temperature and high-temperature physical properties of an asphalt composition when used in the composition. Also, since the vinyl aromatic hydrocarbon-conjugated diene block copolymer may reduce dissolution time by increasing a dissolution rate, storage stability of the asphalt composition may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a schematic view schematically illustrating a preparation process of a vinyl aromatic hydrocarbon-conjugated diene block copolymer according to an embodiment of the present invention.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In general, with respect to a vinyl aromatic hydrocarbon-conjugated diene block copolymer mainly used as an asphalt modifier, in particular, a styrene-butadiene-styrene (SBS) triblock copolymer, an amount of vinyl randomly distributed in a conjugated diene block greatly affects physical properties of asphalt. When the amount of vinyl is increased, a glass transition temperature of a butadiene block is increased to increase high-temperature physical properties of an asphalt composition, but low-temperature physical properties are decreased. Also, when the amount of vinyl is increased, a dissolution rate is also increased due to an increase in reaction rate during sulfur crosslinking. However, in a case in which the amount of vinyl is excessively large, a gel may be formed in the asphalt composition during the sulfur crosslinking. Thus, it is important to improve the low-temperature physical properties while maintaining the high-temperature physical properties and the dissolution rate, i.e., advantages of vinyl structure, by controlling a molecular structure of the copolymer.

For this purpose, in the present invention, during the preparation of an asphalt modifier including a vinyl aromatic hydrocarbon-conjugated diene block copolymer, a conjugated diene block having a relatively small amount of vinyl is polymerized in step 1 for the polymerization of the conjugated diene block and a conjugated diene block having a large amount of vinyl is polymerized using a Lewis base in step 2 such that heterogeneous conjugated diene blocks having different amounts of vinyl are formed in the vinyl aromatic hydrocarbon-conjugated diene block copolymer, wherein, when used in an asphalt composition, the asphalt modifier may improve low-temperature and high-temperature physical properties by optimizing a peak molecular weight (Mp) value in each of the conjugated diene blocks in combining with the amount of vinyl, and since the asphalt modifier may reduce dissolution time by increasing a dissolution rate, storage stability of the asphalt composition may be improved.

That is, an asphalt modifier according to an embodiment of the present invention includes a vinyl aromatic hydrocarbon-conjugated diene block copolymer of Formula 1 below:

$$(A-B-C)_n-D \qquad \text{[Formula 1]}$$

in Formula 1,

A represents a vinyl aromatic hydrocarbon block including a repeating unit structure derived from a vinyl aromatic hydrocarbon-based monomer, in which a peak molecular weight (Mp) is in a range of 10,000 g/mol to 35,000 g/mol, B represents a first conjugated diene block including a repeating unit structure derived from a first conjugated diene monomer, in which an Mp is in a range of 16,000 g/mol to 30,000 g/mol and an amount of vinyl is in a range of 10 wt % to 20 wt % based on a total weight of B, C represents a second conjugated diene block including a repeating unit structure derived from a second conjugated diene monomer, in which an Mp is in a range of 10,000 g/mol to 24,000 g/mol and an amount of vinyl is greater than 20 wt % and equal to or less than 34 wt % based on a total weight of C, D represents a residual group of a coupling agent, and n is the number of vinyl aromatic hydrocarbon-conjugated diene block copolymer arms boned to the residual group of the coupling agent, wherein n is determined according to functionality of the coupling agent used in polymerization and may be an integer between 2 and 4, for example, an integer of 2 or 4.

In the present invention, the expression "peak molecular weight (Mp)" denotes a molecular weight corresponding to a maximum peak obtained from gel permeation chromatography (GPC).

In the vinyl aromatic hydrocarbon-conjugated diene block copolymer of Formula 1, the vinyl aromatic hydrocarbon block (A) specifically includes a repeating unit structure derived from a vinyl-containing aromatic hydrocarbon-based compound having 6 to 30 carbon atoms, such as styrene, vinyl naphthalene, vinyl toluene, or vinyl xylene, and may be a polystyrene (PS) block including a repeating unit structure derived from a styrene-based compound among the above materials.

For example, the polystyrene block may be a PS block including a repeating unit structure which is derived from at least one compound selected from the group consisting of styrene; alkyl styrene having 1 to 20 carbon atoms such as a-methylstyrene, 3-methylstyrene, 4-methylstyrene, or 4-propylstyrene; cycloalkyl styrene having 3 to 30 carbon atoms such as 4-cyclohexylstyrene; aryl styrene having 6 to 30 carbon atoms such as 4-(para-methylphenyl)styrene; and aralkyl styrene having 7 to 30 carbon atoms.

Also, the vinyl aromatic hydrocarbon block (A) may have an Mp of 10,000 g/mol to 35,000 g/mol, for example, 16,000 g/mol to 20,000 g/mol. When the vinyl aromatic hydrocarbon block (A) has the above Mp ranges, the low-temperature physical properties may be improved while maintaining the high-temperature physical properties and storage stability of the asphalt composition.

The vinyl aromatic hydrocarbon block (A) may be included in an amount of 25 wt % to 35 wt %, for example, 29 wt % to 32 wt %, based on a total weight of the copolymer. When the above-described conditions on the Mp and the amount of the vinyl aromatic hydrocarbon block (A) in the copolymer are simultaneously satisfied, the low-temperature physical properties of the asphalt composition may be further improved.

Furthermore, in the vinyl aromatic hydrocarbon-conjugated diene block copolymer of Formula 1, the first and second conjugated diene blocks (B and C) may each independently be a butadiene block including a repeating unit structure derived from a butadiene-based compound and, for example, may include a repeating unit structure which is derived from at least one compound selected from the group consisting of 1,3-butadiene, 2,3-dimethyl-1,3-butadiene, and 2-phenyl-1,3-butadiene.

The first and second conjugated diene blocks (B and C) have different Mps and amounts of vinyl due to the difference in the process of the polymerization step.

Specifically, the first conjugated diene block (B) has a lower amount of vinyl than the second conjugated diene block (C), wherein the first conjugated diene block (B) may have an Mp of 16,000 g/mol to 30,000 g/mol, the amount of vinyl in the first conjugated diene block (B) may be in a range of 10 wt % to 20 wt %, the second conjugated diene block (C) may have an Mp of 10,000 g/mol to 24,000 g/mol, and the amount of vinyl in the second conjugated diene block (B) may be greater than 20 wt % and equal to or less than 34 wt %. For example, the first conjugated diene block (B) may have an Mp of 18,000 g/mol to 26,000 g/mol and an amount of vinyl of 15 wt % to 18 wt %, and the second conjugated diene block (C) may have an Mp of 10,000 g/mol to 22,000 g/mol and an amount of vinyl of 30 wt % to 34 wt %. When the above-described conditions on the Mps and the amounts of vinyl of the first and second conjugated diene blocks (B and C) are simultaneously satisfied, the low-temperature physical properties may be improved while maintaining the high-temperature physical properties and storage stability of the asphalt composition.

Also, in the vinyl aromatic hydrocarbon-conjugated diene block copolymer of Formula 1, a total amount of vinyl included in the first and second conjugated diene blocks (B and C) may be in a range of 15 wt % to 30 wt %, for example, 20 wt % to 25 wt %, based on a total weight of the first and second conjugated diene blocks (B and C). When the condition of the amount of vinyl in each of the first and second conjugated diene blocks (B and C) and the condition of the amount of vinyl based on the total weight of the first and second conjugated diene blocks (B and C) are simultaneously satisfied, the effect of improving the low-temperature physical properties of the asphalt composition may be more significant.

Furthermore, in the vinyl aromatic hydrocarbon-conjugated diene block copolymer of Formula 1, the residual group (D) of the coupling agent is a coupling agent-derived multifunctional group which is formed as a result of the polymerization of a vinyl aromatic hydrocarbon-first conjugated diene-second conjugated diene triblock copolymer and a coupling agent in the presence of a polymerization initiator or a living anion as a polymer chain having an anionic end initiated from the polymerization initiator. Specifically, the residual group (D) of the coupling agent is a linear or branched alkylene group having 1 to 12 carbon atoms which includes at least one functional group selected from the group consisting of a vinyl group, an ether group, a carbonyl group, a carboxyl group, an ester group, a silanol group, and a silyl group.

For example, in the vinyl aromatic hydrocarbon-conjugated diene block copolymer of Formula 1, the residual group (D) of the coupling agent may be a functional group having a structure of the following Formulae 2a to 2c when n=2, and may be a functional group having a structure of the following Formula 2d when n=3.

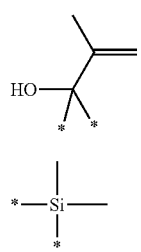

[Formula 2a]

[Formula 2b]

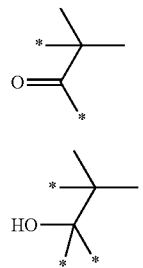

[Formula 2c]

[Formula 2d]

(where is a part which may be bonded to a vinyl aromatic hydrocarbon block or a conjugated diene block unit in the vinyl aromatic hydrocarbon-conjugated diene block copolymer, and, in this case, one to three vinyl aromatic hydrocarbon-conjugated diene block copolymers for one residual group of the coupling agent may be bonded.)

Also, in the vinyl aromatic hydrocarbon-conjugated diene block copolymer of Formula 1, the residual group of the coupling agent may be specifically included in an amount of 40 ppm to 4,700 ppm, for example, 100 ppm to 3,500 ppm, based on the total weight of the vinyl aromatic hydrocarbon-conjugated diene block copolymer. When the residual group of the coupling agent is included within the above range, compatibility with asphalt may be improved and the effect of improving the storage stability of the asphalt composition may be excellent.

Furthermore, the vinyl aromatic hydrocarbon-conjugated diene block copolymer of Formula 1 may have a coupling efficiency of 50% to 90%, for example, 70% to 90%. In this case, the coupling efficiency of the copolymer obtained as a result of the reaction between an anionic active site of a vinyl aromatic hydrocarbon-conjugated diene polymer end and the coupling agent may be obtained according to the following Equation 1 using an area of a polymer peak in gel permeation chromatography (GPC).

Coupling Efficiency (%)=(area of coupled polymer)/
(area of total polymer)×100      [Equation 1]

Also, coupling number (CN) may be obtained according to the following Equation 2 using a gel permeation chromatogram.

Coupling Number=(peak molecular weight of
coupled polymer)/(peak molecular weight of
polymer before coupling)      [Equation 2]

In general, when the coupling efficiency is excessively low during the preparation of the copolymer, physical properties of the copolymer may be reduced, and when the coupling efficiency is excessively high, the preparation may not only be difficult, but processability may also be low due to high melt viscosity of the prepared copolymer. In contrast, since the copolymer has the above range of coupling efficiency, the compatibility with asphalt may be improved and the dissolution rate is increased to improve the storage stability of the asphalt composition.

Also, the vinyl aromatic hydrocarbon-conjugated diene block copolymer of Formula 1 may have an Mp of 50,000 g/mol to 200,000 g/mol, for example, 90,000 g/mol to 120,000 g/mol. When the vinyl aromatic hydrocarbon-conjugated diene block copolymer of Formula 1 has the above range of Mp, the low-temperature physical properties may be improved while maintaining the high-temperature physical properties and storage stability of the asphalt composition.

Furthermore, the vinyl aromatic hydrocarbon-conjugated diene block copolymer of Formula 1 may have a toluene solution viscosity (5% TSV) at 25° C. of 9 cSt to 15 cSt, for example, 10 cSt to 13 cSt. In this case, the toluene solution viscosity (TSV) is a viscosity value measured after the copolymer is dissolved in 5v/v % toluene. When the vinyl aromatic hydrocarbon-conjugated diene block copolymer of Formula 1 has the above range of viscosity, the low-temperature physical properties may be improved while maintaining the high-temperature physical properties and storage stability of the asphalt composition.

The asphalt modifier according to the embodiment of the present invention may further include a vinyl aromatic-conjugated diene block copolymer of Formula 3 below.

(A-B-C)-D-(H)$_{n-1}$ [Formula 3]

In Formula 3, A, B, C, and D are the same as previously defined.

The vinyl aromatic-conjugated diene block copolymer of Formula 3 is a compound formed as a result in which a coupling reaction does not occur in the preparation process of the vinyl aromatic hydrocarbon-conjugated diene block copolymer of Formula 1. Accordingly, the asphalt modifier may include the vinyl aromatic-conjugated diene block copolymer of Formula 3 in a state in which it is mixed with the vinyl aromatic hydrocarbon-conjugated diene block copolymer of Formula 1.

Also, in a case in which the asphalt modifier further includes the aromatic-conjugated diene block copolymer of Formula 3, the average number of vinyl aromatic hydrogen-conjugated diene block copolymer arms bonded to the residual group of the coupling agent in a mixture of the aromatic-conjugated diene block copolymers of Formulae 1 and 3 may be a rational number between 1 and 4, and the copolymer of Formula 3 may be included in an amount that satisfies the condition on the above average number of the arms.

For example, in a case in which the number (n) of the arms of the aromatic-conjugated diene block copolymer of Formula 1 is 2, that is, in a case in which a bifunctional coupling agent is used, the uncoupled aromatic-conjugated diene block copolymer of Formula 3 may be included in an amount such that the average number of the arms in the mixture of the aromatic-conjugated diene block copolymers of Formulae 1 and 3 is in a range of 1.5 to 2 or 1.7 to 1.9.

According to another embodiment of the present invention, provided is a method of preparing the asphalt modifier including: preparing a first mixed solution including a polymer for forming a vinyl aromatic hydrocarbon block by primary polymerization of a vinyl aromatic hydrocarbon-based monomer using a polymerization initiator in a hydrocarbon-based solvent (step 1); preparing a second mixed solution including a vinyl aromatic hydrocarbon-first conjugated diene diblock copolymer by adding a conjugated diene to the first mixed solution and performing secondary polymerization (step 2); preparing a third mixed solution including a vinyl aromatic hydrocarbon-first conjugated diene-second conjugated diene triblock copolymer by adding a Lewis base and a conjugated diene to the second mixed solution and performing third polymerization (step 3); and performing a coupling reaction by adding a coupling agent to the third mixed solution (step 4).

Hereinafter, the method will be described in detail for each step, wherein step 1 is a step of preparing a first mixed solution including a copolymer for forming a vinyl aromatic hydrocarbon block by anionic polymerization of a vinyl aromatic hydrocarbon-based monomer in a hydrocarbon-based solvent in the presence of a polymerization initiator.

In step 1, the vinyl aromatic hydrocarbon-based monomer may be a vinyl-containing aromatic hydrocarbon-based compound having 6 to 30 carbon atoms and may specifically include one selected from the group consisting of a styrene-based compound, a vinyl naphthalene-based compound, a vinyl toluene-based compound, and a vinyl xylene-based compound, or a compound of two or more thereof.

Among the above compounds, the vinyl aromatic hydrocarbon-based monomer, for example, may be a styrene-based compound, and the styrene-based compound may specifically include one selected from the group consisting of styrene; alkyl styrene having 1 to 20 carbon atoms such as a-methylstyrene, 3-methylstyrene, 4-methylstyrene, 4-propylstyrene, p-tert-butylstyrene, or 2,4-dimethylstyrene; cycloalkyl styrene having 3 to 30 carbon atoms such as 4-cyclohexylstyrene; aryl styrene having 6 to 30 carbon atoms such as 4-(para-methylphenyl)styrene; or aralkyl styrene having 7 to 30 carbon atoms, or a compound of two or more thereof.

Also, the vinyl aromatic hydrocarbon-based monomer may be used in an appropriate amount in consideration of an amount of the vinyl aromatic hydrocarbon block in the finally prepared vinyl aromatic hydrocarbon-conjugated diene block copolymer.

Furthermore, the hydrocarbon-based solvent usable in step 1 is not particularly limited so long as it does not react with the polymerization initiator and is typically used in anionic polymerization. Specifically, the hydrocarbon-based solvent may include a linear or branched hydrocarbon compound such as butane, n-pentane, n-hexane, n-heptane, or isooctane; an alkyl-substituted or unsubstituted cyclic hydrocarbon compound such as cyclopentane, cyclohexane, cycloheptane, methyl cyclohexane, or methyl cycloheptane; and an alkyl-substituted or unsubstituted aromatic hydrocarbon compound such as benzene, toluene, xylene, or naphthalene, and any one thereof or a mixture of two or more thereof may be used.

The polymerization in step 1 may be performed in the presence of anions of the polymerization initiator. The polymerization initiator may specifically include an organic metal compound or a living anion as a polymer chain having an anionic end initiated from the polymerization initiator.

Specifically, the organic metal compound may be an organic lithium compound of Formula 4 below:

R-Li [Formula 4]

(where R is selected from the group consisting of hydrocarbon groups of an aliphatic group having 1 to 20 carbon atoms, a cycloaliphatic group, an alkyl-substituted cycloaliphatic group, an aromatic group, and an alkyl-substituted aromatic group.)

For example, the organic metal compound may include one selected from the group consisting of n-butyllithium, sec-butyllithium, tert-butyllithium, methyllithium, ethyllithium, isopropyllithium, cyclohexyllithium, allyllithium, vinyllithium, phenyllithium, and benzyllithium, or a mixture of two or more thereof.

Also, the polymerization initiator may be used in an amount of 0.3 mol to 33 mol based on a total sum of the monomers for forming the vinyl aromatic hydrocarbon-conjugated diene block copolymer.

Furthermore, the polymerization in step 1 may be performed at a temperature of 20° C. to 100° C. and a pressure of atmospheric pressure (1±0.5 kgf/cm$^2$) to 5 kgf/cm$^2$, and the polymerization may be performed within a range that satisfies the condition on the amount of the vinyl aromatic hydrocarbon block in the finally prepared block copolymer of styrene-first butadiene-second butadiene (SBS).

As a result of step 1, a polymer of vinyl aromatic hydrocarbon, i.e., a polymer for forming a vinyl aromatic hydrocarbon block, is formed.

Step 2 is a step of preparing a vinyl aromatic hydrocarbon-first conjugated diene diblock copolymer including a conjugated diene block having a small amount of vinyl by adding a conjugated diene to the first mixed solution, in which the polymer for forming a vinyl aromatic hydrocarbon block is formed in step 1, and performing secondary polymerization.

In step 2, the conjugated diene may specifically be a butadiene-based compound and, for example, may include one selected from the group consisting of 1,3-butadiene, 2,3-dimethyl-1,3-butadiene, and 2-phenyl-1,3-butadiene, or a mixture of two or more thereof.

An amount of the above-described conjugated diene used may be appropriately adjusted in consideration of an amount of the first conjugated diene in the finally prepared vinyl aromatic hydrocarbon-conjugated diene block copolymer.

Also, similar to step 1, the polymerization of the conjugated diene in step 2 may be performed by anionic polymerization. Accordingly, the condition during the polymerization in step 2 may be the same as that in step 1.

Thus, the first conjugated diene block formed as a result of the anionic polymerization may have a relatively smaller amount of vinyl than the second conjugated diene block polymerized by using a Lewis base in the subsequent step, and, specifically, may have an amount of vinyl of 10 wt % to 20 wt %, for example, 15 wt % to 18 wt %.

As a result of the reaction in step 2, a vinyl aromatic hydrocarbon-first conjugated diene diblock copolymer is prepared.

Step 3 is a step of preparing a third mixed solution including a vinyl aromatic hydrocarbon-first conjugated diene-second conjugated diene triblock copolymer by adding a conjugated diene and a Lewis base to the second mixed solution, in which the vinyl aromatic hydrocarbon-first conjugated diene diblock copolymer is formed in step 2, and performing polymerization.

In step 3, the Lewis base functions to increase a polymerization rate during the polymerization of the conjugated diene and increase an amount of vinyl in the conjugated diene block. Specifically, the Lewis base may include ditetrahydrofurylpropane (DTHFP), tetrahydrofurane (THF), tetramethylenediamine, or tetramethylethylenediamine (TMEDA), and any one thereof or a mixture of two or more thereof may be used.

The Lewis base may be used in a sufficient amount and, specifically, may be used in an amount of 500 ppm to 2,000 ppm based on an amount of the vinyl aromatic hydrocarbon-first conjugated diene diblock copolymer included in the second mixed solution. In a case in which the amount of the Lewis base used is less than 500 ppm, an amount of vinyl in the prepared vinyl aromatic hydrocarbon-conjugated diene block copolymer may decrease, and in a case in which the amount of the Lewis base used is greater than 2,000 ppm, the amount of vinyl may significantly increase and polymerization temperature may rapidly increase.

Also, in step 3, the addition of the Lewis base may be performed at a temperature of 40° C. to 100° C. and a pressure of 0.1 bar to 3 bar. When the temperature is excessively low, specifically, less than 40° C., during the addition of the Lewis base, the polymerization rate may be low, and when the temperature is excessively high, specifically, greater than 100° C., the amount of vinyl in the prepared vinyl aromatic hydrocarbon-conjugated diene block copolymer may decrease. Also, when the pressure is excessively low, for example, less than 0.1 bar, during the addition of the Lewis base, miscibility with the solution may decrease, and when the pressure is excessively high, for example, greater than 3 bar, the addition of the Lewis base may be difficult. For example, the addition of the Lewis base may be performed at a temperature of 50° C. to 90° C. and a pressure of 1 bar to 2 bar.

As a result of step 3, a vinyl aromatic hydrocarbon-first conjugated diene-second conjugated diene triblock copolymer, which includes a second conjugated diene block having a relatively larger amount of vinyl than the first conjugated diene block, specifically, greater than 20 wt % and equal to or less than 34 wt %, and more specifically, 30 wt % to 33 wt %, is prepared by using the Lewis base as described above.

Step 4 is a step of performing a coupling reaction by adding a coupling agent to the third mixed solution in which the vinyl aromatic hydrocarbon-first conjugated diene-second conjugated diene triblock copolymer is formed in step 3.

In step 4, the coupling agent is a multifunctional coupling agent, wherein the coupling agent may specifically be a compound including at least one functional group selected from the group consisting of a vinyl group, an ether group, a carbonyl group, a carboxyl group, an ester group, a silanol group, and a silyl group in the molecule.

For example, the coupling agent may include vinyl group-containing hydrocarbon-based compounds such as divinylbenzene; ester-based compounds such as diethyl adipate and glycidyl methacrylate (GMA); silane-based compounds such as dimethyldichlorosilane (DMDCS), methyldichlorosilane, methoxysilane, glycidoxy trimethoxysilane, or oxy-dipropyl-bis(trimethoxysilane); polysiloxane-based compounds such as α,ω-bis(2-trichlorosilylethyl)polydimethylsiloxane; or polyketone, and any one thereof or a mixture of two or more thereof may be used.

The coupling agent may be specifically used in an amount of 40 ppm to 4,700 ppm in the fourth mixed solution.

The coupling agent may connect conjugated diene blocks of the block copolymer to each other by reacting with an anionic active site of a second conjugated diene block end of the vinyl aromatic hydrocarbon-first conjugated diene-second conjugated diene triblock copolymer prepared in step 3 and may simultaneously undergo a functionalization reaction.

As a result of the above-described coupling reaction, the vinyl aromatic hydrocarbon-conjugated diene block copolymer of Formula 1 is prepared. In this case, the aromatic hydrocarbon-conjugated diene block copolymer of Formula 3, which is not subjected to the coupling reaction, may be present in a mixture with the product obtained as a result of the coupling reaction.

The presence of the aromatic hydrocarbon-conjugated diene block copolymer of Formula 3 may be confirmed by the fact that n, as the number of vinyl aromatic hydrocarbon-conjugated diene block copolymer arms bonded to the residual group of the coupling agent, is represented by a rational number instead of an integer during the analysis of the product obtained as a result of the coupling reaction. That is, in a case in which the aromatic hydrocarbon-conjugated diene block copolymer of Formula 3 is present in the mixture, n may be analyzed as the average number of the vinyl aromatic hydrocarbon-conjugated diene block copolymer arms in which a mixing ratio of the copolymer of Formula 1 to the copolymer of Formula 3 as well as the functionality of the coupling agent is considered. For example, in a case in which a bifunctional coupling agent is used, a mixture is obtained in which the coupled vinyl aromatic hydrocarbon-conjugated diene block copolymer of Formula 1 and the uncoupled vinyl aromatic hydrocarbon-conjugated diene block copolymer of Formula 3 are mixed at a predetermined mixing ratio, and, in this case, the average number of n is determined according to the mixing ratio of the two copolymers obtained and the functional group of the coupling agent. The average number of n may be a rational number of 1 to 2, specifically, a rational number of 1.5 to 2, and more specifically, a rational number of 1.7 to 1.9.

Also, the method of preparing the asphalt modifier according to the embodiment of the present invention may further selectively include removing activity of the active polymer by adding water or alcohol in a reactor after the coupling reaction in step 4.

FIG. 1 is a schematic view schematically illustrating a preparation process of a vinyl aromatic hydrocarbon-conjugated diene block copolymer according to an embodiment of the present invention. FIG. 1 is only an example for describing the present invention and the present invention is not limited thereto.

Hereinafter, the preparation process will be described in detail for each step with reference to FIG. 1, wherein a first mixed solution including a polymer a for forming a vinyl aromatic hydrocarbon block may be prepared by primary polymerization of a styrene monomer (SM), as a vinyl aromatic hydrocarbon-based monomer, in a hydrocarbon-based solvent by using a polymerization initiator, such as n-butyllithium (n-BL) (step 1, S1), a second mixed solution including a vinyl aromatic hydrocarbon-first conjugated diene diblock copolymer b may be prepared by adding butadiene ($1^{st}$ BD), as a conjugated diene, to the first mixed solution prepared in step 1 and performing secondary polymerization (step 2, S2), a third mixed solution including a vinyl aromatic hydrocarbon-first conjugated diene-second conjugated diene triblock copolymer c may be prepared by adding a Lewis base and a conjugated diene ($2^{nd}$ BD) to the second mixed solution prepared in step 2 and performing third polymerization (step 3, S3), and a vinyl aromatic hydrocarbon-conjugated diene block copolymer d may be prepared by adding a coupling agent CA to perform a coupling reaction (step 4, S4).

According to another embodiment of the present invention, an asphalt composition including the above-described asphalt modifier is provided.

The asphalt composition may specifically include an asphalt and a crosslinking agent in addition to the asphalt modifier including the vinyl aromatic hydrocarbon-conjugated diene block copolymer.

For example, the asphalt composition may include 1 wt % to 10 wt % of the asphalt modifier, 87 wt % to 98.95 wt % of the asphalt, and 0.05 wt % to 3 wt % of the crosslinking agent based on a total weight of the composition.

When the asphalt composition includes each component in an amount within the above ranges, excellent storage stability of the asphalt composition may be secured. In a case in which the amount of the asphalt modifier is greater than the above range, manufacturing costs of the asphalt composition may increase, and in a case in which the amount of the crosslinking agent is greater than the above range, modified asphalt may lost elasticity due to the excessive crosslinking reaction and may be gelated. In contrast, in a case in which the amount of each of the asphalt modifier and the crosslinking agent is less than the above range, high-temperature physical properties of the asphalt composition may be reduced due to a low degree of asphalt modification.

Also, in the asphalt composition, the crosslinking agent is not particularly limited as long as it is a sulfur compound including sulfur or iron sulfate, and a typical example of the crosslinking agent may be a sulfur element.

Furthermore, in the asphalt composition, the asphalt may include 1 wt % to 40 wt %, specifically, 5 wt % to 30 wt %, of asphaltene based on a total weight of the asphalt.

The asphalt composition has a high dissolution rate and, for example, in a case in which the asphalt modifier, i.e., the vinyl aromatic hydrocarbon-conjugated diene block copolymer, is included in an amount of about 4 wt % to about 5 wt % under vulcanization conditions, a dissolution time may be 4 hours or less, specifically, in a range of 40 minutes to 210 minutes, and more specifically, in a range of 40 minutes to 150 minutes.

Also, the asphalt composition has excellent high-temperature physical properties and low-temperature physical properties, wherein the asphalt composition may have a softening point of 60° C. to 90° C. and an elongation at 5° C. of 200 mm or more.

Hereinafter, exemplary embodiments will be described in detail to fully explain the present invention in such a manner that it may easily be carried out by a person with ordinary skill in the art to which the present invention pertains. However, the present invention may be modified in various forms and is not limited to the disclosed embodiments.

EXAMPLE 1

Preparation of Asphalt Modifier 4,400 g of purified cyclohexane and 310 g of styrene were added in a 10 L reactor filled with nitrogen and the temperature was increased to 60° C. while stirring. A styrene block was polymerized by adding 1.2 g of n-butyllithium (n-BL) to a mixed solution of the cyclohexane and styrene at 60° C.

Subsequently, 345 g of first butadiene ($1^{st}$ BD) was added to the mixed solution in which the styrene block was formed by polymerization, and polymerization was performed until the first butadiene was completely consumed to prepare a styrene-first butadiene diblock copolymer. 1.05 g of ditetrahydrofurylpropane (DTHFP), as a Lewis base, was added to the mixed solution, in which the styrene-first butadiene diblock copolymer was formed by polymerization, under conditions of 80° C. and 2 bar, 345 g of second butadiene ($2^{nd}$ BD) was subsequently added, and polymerization was performed until the second butadiene was completely consumed to prepare a styrene-first butadiene-second butadiene triblock copolymer.

After the completion of the polymerization, a coupling reaction was performed by adding 1.35 g of dimethyldichlorosilane (DMDCS), as a coupling agent, to a mixed solution in which the styrene-first butadiene-second butadiene copolymer was formed by polymerization. Subsequently, reactivity was removed by adding 0.2 g of water as a reaction terminator, and 3 g of Irganox™ 1076 (Ciba Specialty Chemicals Co.) and 5.8 g of TNPP™ (Adeka Chemical Co.), as an antioxidant, were then added to the resultant mixed solution to prepare a styrene-first butadiene-second butadiene block copolymer as a vinyl aromatic hydrocarbon-conjugated diene block copolymer.

Next, in order to recover only the copolymer prepared in the reaction solution, a typical stripping process was performed. Specifically, 0.7 g of Tamol™ (BASF SE) and 0.5 g of $CaCl_2$, as a dispersant, were added to 3 L of water and boiled, and the solution, in which the styrene-first butadiene-second butadiene block copolymer was formed, was then slowly added to the boiling water to agglomerate the copolymer in the water. As a result, a block copolymer pellet (1) of styrene-first butadiene-second butadiene (SBS) was prepared by drying the agglomerated copolymer at 60° C. for 16 hours in an oven.

EXAMPLES 2 TO 4 AND COMPARATIVE EXAMPLES 1 TO 5

Preparation of SBS Block Copolymers

SBS block copolymers were prepared in the same manner as in Example 1 except that components listed in the following Table 1 were used in the amounts listed below.

TABLE 1

|  | Cyclo hexane | DTHFP (before polymerization) | Styrene | n-BL | $1^{st}$ BD | DTHFP (During polymerization) | $2^{nd}$ BD | DMDCS |
|---|---|---|---|---|---|---|---|---|
| Example 1 | 4,400 | — | 310 | 1.2 | 345 | 1.05 | 345 | 1.35 |
| Example 2 | 4,400 | — | 310 | 1.2 | 345 | 1.07 | 345 | 1.35 |
| Example 3 | 4,400 | — | 290 | 1.1 | 355 | 1.07 | 345 | 0.94 |
| Example 4 | 4,400 | — | 310 | 1.0 | 345 | 0.6 | 345 | 0.9 |
| Comparative Example 1 | 4,400 | — | 310 | 1.2 | 345 | — | 345 | 1.35 |
| Comparative Example 2 | 4,400 | 0.3 | 310 | 1.2 | 345 | — | 345 | 1.35 |
| Comparative Example 3 | 4,400 | — | 310 | 1.0 | 345 | — | 345 | 0.9 |
| Comparative Example 4 | 4,400 | — | 310 | 1.2 | 207 | 1.07 | 483 | 1.35 |
| Comparative Example 5 | 4,400 | — | 350 | 1.3 | 325 | 2.3 | 325 | 1.40 |

* In Table 1, the unit of the amount of each raw material is expressed in gram (g), and definitions of the abbreviations are as follows:
DTHFP: ditetrahydrofurylpropane
n-BL: n-butyllithium
$1^{st}$ BD: first butadiene
$2^{nd}$ BD: second butadiene
DMDCS: dimethyldichlorosilane

EXPERIMENTAL EXAMPLE 1

Physical Property Evaluation of SBS Block Copolymers

Viscosities (5% TSV) of the SBS block copolymers prepared in Examples 1 to 4 and Comparative Examples 1 to 5; Mps of polystyrene (PS) block, polystyrene-polybutadiene diblock (PSB), first butadiene block (LVB), second butadiene block (HVB), and styrene-first butadiene-second butadiene block copolymer (SBS) in the prepared copolymers; coupling efficiencies; an amount of styrene monomer-derived block (SM) in the SBS, amounts of vinyls (LVB vinyl and HVB vinyl) in each of the first and second butadiene blocks, and an amount of vinyl (SBS vinyl) included in a polybutadiene block, which includes both of the LVB and the HVB, were respectively measured, and the results thereof are presented in Table 2 below.

TABLE 2

|  | 5% TSV[1] (cSt) | PS[2] MP (g/mol) | PSB[3] MP (g/mol) | LVB[4] MP (g/mol) | HVB[5] MP (g/mol) | SBS MP (g/mol) | Coupling efficiency (%) | SM (wt % in SBS) | LVB vinyl (wt % in LVB) | HVB vinyl (wt % in HVB) | SBS vinyl (wt % in PBD[6]) |
|---|---|---|---|---|---|---|---|---|---|---|---|
| Example 1 | 10.19 | 16269 | 52470 | 25341 | 10860 | 94352 | 79.34 | 30.89 | 16.82 | 30.71 | 20.99 |
| Example 2 | 10.63 | 16465 | 53114 | 18325 | 18325 | 93347 | 87.88 | 31.44 | 16.79 | 32.47 | 24.65 |
| Example 3 | 12.07 | 16491 | 56515 | 20012 | 20012 | 101422 | 83.32 | 29.18 | 15.02 | 32.34 | 23.68 |
| Example 4 | 12.97 | 19382 | 62180 | 21399 | 21399 | 112390 | 79.53 | 31.17 | 17.11 | 32.05 | 24.58 |
| Comparative Example 1 | 10.50 | 16063 | 51763 | 35700 | — | 90969 | 86.44 | 31.55 | 15.10 | — | 15.11 |
| Comparative Example 2 | 10.07 | 16579 | 53500 | — | 36921 | 96188 | 82.71 | 31.01 | — | 25.71 | 25.71 |
| Comparative Example 3 | 13.01 | 19008 | 60037 | 41029 | — | 107711 | 80.48 | 31.66 | 14.34 | — | 14.34 |
| Comparative Example 4 | 10.23 | 16738 | 54021 | 11185 | 26098 | 97708 | 83.9 | 30.92 | 16.75 | 36.48 | 30.58 |
| Comparative Example 5 | 7.65 | 16666 | 47563 | 15449 | 15449 | 86272 | 79.31 | 35.55 | 14.51 | 35.56 | 25.03 |

* definitions of abbreviations 1) to 6) in Table 2 are as follows:

[1] TSV: Toluene Solution Viscosity, wherein it is measured at 25° C. by dissolving 5 vol % of the copolymer in toluene.

[2] PS: polystyrene block

[3] PSB: Polystyrene-Polybutadiene diblock

[4] LVB: First butadiene block

[5] HVB: Second butadiene block, wherein HVB Mp = PSB Mp – PS Mp – LVB Mp.

[6] PBD: Polybutadiene block including both of the LVB and HVB

EXPERIMENTAL EXAMPLE 2

Preparation and Evaluation of Asphalt Compositions 500 g of asphalt (AP3, SK Corporation) was added to a heating mantle and the SBS block copolymers prepared in Examples 1 and 2 and Comparative Examples 1 and 2 were respectively added in an amount of 4.76 wt % based on a total weight of an asphalt composition while stirring at a high shear rate of 2,500 rpm at 180° C. After 30 minutes, 0.53 g of sulfur as a crosslinking agent was added and stirred at a low shear rate of 200 rpm. In this case, while observing with a fluorescence microscope, the asphalt was stirred until the SBS copolymer was dissolved to prepare an asphalt composition.

Physical properties of the prepared asphalt compositions were evaluated by the following methods, and the results thereof are presented in Table 3.

(1) Dissolution Time

Time until the SBS copolymer was dissolved during the preparation of the asphalt composition was measured.

(2) Softening Point (° C.)

A softening point is a measure of high-temperature physical properties of the modified asphalt measured in accordance with American Society for Testing and Materials (ASTM) D36, wherein a sample began to soften by heating water or glycerin at a rate of 5° C./minute and temperature was measured when a ball having a diameter of 9.525 mm and a weight of 3.5 g disposed on the sample moved down about 1 inch.

(3) Elongation (5° C., mm)

Elongation (5) is a measure of low-temperature physical properties of the modified asphalt measured in accordance with ASTM D113, wherein, when a sample was stretched in both directions in a thermostat maintaining at 5° C., a length increased immediately before sample breakage was measured.

(4) Storage Stability (ΔT)

Storage stability was measured in such a manner that 50 g of the asphalt composition was weighed and left standing in an aluminum tube at 163° C. for 48 hours in an oven, the asphalt composition was left standing at −5° C. for 4 hours or more in a cooler and then divided into three equal parts, and softening points of the top and bottom parts were measured by ASTM method D36. In general, when a temperature difference is within 2.5° C., phase separation does not occur, and it may be evaluated that the smaller the difference is, the higher the storage stability is.

TABLE 3

| | PS Mp (g/mol) | LVB Mp (g/mol) | HVB Mp (g/mol) | LVB vinyl (wt % in LVB) | HVB vinyl (wt % in HVB) | Dissolution time (min) | Softening point (° C.) | 5° C. elongation (mm) | Phase separation test (ΔT) |
|---|---|---|---|---|---|---|---|---|---|
| Example 1 | 16269 | 25341 | 10860 | 16.82 | 30.71 | 60 | 87.1 | 231 | 1.0 |
| Example 2 | 16465 | 18325 | 18325 | 16.79 | 32.47 | 45 | 88.4 | 222 | 2.0 |
| Comparative Example 1 | 16063 | 35700 | — | 15.10 | — | 130 | 84.8 | 239 | 0.4 |
| Comparative Example 2 | 16579 | — | 36921 | — | 25.71 | 45 | 88.0 | 145 | 0.4 |

According to the experimental results, the asphalt compositions of Examples 1 and 2 had significantly shorter dissolution times and higher softening points, as high-temperature physical properties, than Comparative Example 1 in which the butadiene block having a large amount of vinyl (HVB) was absent.

In general, when the amount of vinyl is increased, a glass transition temperature of the butadiene block is increased to rapidly reduce low-temperature elongation. However, 5° C. low-temperature elongations, as low-temperature physical properties, of the asphalt compositions of Examples 1 and 2 were improved in comparison to that of Comparative Example 2 including only the HVB.

From the above experimental results, it may be understood that Examples 1 and 2 including both of the HVB and LVB may significantly reduce the dissolution time without a decrease in the low-temperature elongation properties.

EXPERIMENTAL EXAMPLE 3

Preparation and Evaluation of Asphalt Compositions

Asphalt compositions were prepared in the same manner as in Experimental Example 2 except that the styrene butadiene block copolymers prepared in Examples 3 and 4 and Comparative Example 3 were respectively added in an amount of 4.30 wt % based on the total weight of the asphalt composition, and physical properties of the asphalt compositions were evaluated by the same experimental methods as in Experimental Example 2. The results thereof are presented in Table 4.

TABLE 4

|  | PS Mp (g/mol) | LVB Mp (g/mol) | HVB Mp (g/mol) | LVB vinyl (wt % in LVB) | HVB vinyl (wt % in HVB) | Dissolution time (min) | Softening point (° C.) | 5° C. elongation (mm) | Phase separation test (ΔT) |
|---|---|---|---|---|---|---|---|---|---|
| Example 3 | 16491 | 20012 | 20012 | 15.02 | 32.34 | 140 | 77.0 | 213 | 0.7 |
| Example 4 | 19382 | 21399 | 21399 | 17.11 | 32.05 | 205 | 67.8 | 203 | 2.1 |
| Comparative Example 3 | 19008 | 41029 | — | 14.34 | — | 255 | 65.8 | 211 | 0.7 |

According to the experimental results, the asphalt compositions of Examples 3 and 4 including the SBS copolymer had significantly shorter dissolution times and higher softening points, as high-temperature physical properties, than Comparative Example 3 including only the block having a small amount of vinyl.

EXPERIMENTAL EXAMPLE 4

Preparation and Evaluation of Asphalt Compositions

Asphalt compositions were prepared in the same manner as in Experimental Example 2 except that the styrene butadiene block copolymers prepared in Example 2 and Comparative Examples 4 and 5 were respectively added in an amount of 4.30 wt % based on the total weight of the asphalt composition, and physical properties of the asphalt compositions were evaluated by the same experimental methods as in Experimental Example 2. The results thereof are presented in Table 5.

TABLE 5

|  | PS Mp (g/mol) | LVB Mp (g/mol) | HVB Mp (g/mol) | LVB vinyl (wt % in LVB) | HVB vinyl (wt % in HVB) | Dissolution time (min) | Softening point (° C.) | 5° C. elongation (mm) | Phase separation test (ΔT) |
|---|---|---|---|---|---|---|---|---|---|
| Example 2 | 16465 | 18325 | 18325 | 16.79 | 32.47 | 95 | 64.9 | 209 | 2.1 |
| Comparative Example 4 | 16738 | 11185 | 26098 | 16.75 | 36.48 | 90 | 65.0 | 185 | 2.6 |
| Comparative Example 5 | 16666 | 15449 | 15449 | 14.51 | 35.56 | 120 | 57.6 | 207 | 0.5 |

According to the experimental results, the asphalt composition of Example 2 including the SBS copolymer had a similar dissolution rate or similar high-temperature physical properties, but had significantly improved 5° C. elongation properties in comparison to Comparative Example 4 which had a similar molecular weight, but had a high ratio of the HVB to the LVB, an amount of vinyl in the HVB of 35 wt % or more, and an Mp of the HVB of 25,000 g/mol. Also, with respect to Comparative Example 5, molecular weights were overall low, and, in particular, the molecular weight of the LVB was 16,000 g/mol or less, wherein the amount of the 1$^{st}$ BD was lower than the amount of the styrene. Thus, the high-temperature viscosity as well as softening point of the asphalt was reduced due to the excessively low molecular weight of the LVB. As a result, the softening point of Comparative Example 5 was reduced by 7° C. or more in comparison to those of Example 2 and Comparative Example 4. Also, with respect to Example 5, the amount of vinyl in the HVB was 35 wt % or more, wherein its 5° C. elongation was lower than that of Example 2.

From the above experimental results, it may be understood that it was desirable to have an Mp of the LVB of 16,000 g/mol to 30,000 g/mol and an Mp of the HVB of 10,000 g/mol to 24,000 g/mol. Also, since the low-temperature elongation was reduced in comparison to the SBS including only the LVB when the amount of vinyl in the HVB was 35 wt % or more, it may be understood that it was desirable to have the amount of vinyl in the HVB of greater than 20 wt % and equal to or less than 34 wt %.

The invention claimed is:

1. An asphalt modifier comprising a vinyl aromatic hydrocarbon-conjugated diene block copolymer of Formula 1:

(A-B-C)$_n$-D     [Formula 1]

in Formula 1,
A represents a vinyl aromatic hydrocarbon block having a peak molecular weight (Mp) of 10,000 g/mol to 35,000 g/mol,
B represents a first conjugated diene block having a peak molecular weight (Mp) of 16,000 g/mol to 30,000 g/mol and an amount of vinyl of 10 wt % to 20 wt %,
C represents a second conjugated diene block having a peak molecular weight (Mp) of 10,000 g/mol to 24,000 g/mol and an amount of vinyl of greater than 20 wt % and equal to or less than 34 wt %,
D represents a residual group of a coupling agent, and
n is an integer between 2 and 4.

2. The asphalt modifier of claim 1, wherein the vinyl aromatic hydrocarbon block is included in an amount of 25 wt % to 35 wt % based on a total weight of the vinyl aromatic hydrocarbon-conjugated diene block copolymer.

3. The asphalt modifier of claim 1, wherein the vinyl aromatic hydrocarbon block comprises a repeating unit structure which is derived from at least one compound selected from the group consisting of styrene, α-methylstyrene, 3-methylstyrene, 4-methylstyrene, 4-propylstyrene, 4-cyclohexylstyrene, and 4-(para-methylphenyl)styrene.

4. The asphalt modifier of claim 1, wherein the first conjugated diene block has a peak molecular weight (Mp) of 18,000 g/mol to 26,000 g/mol and an amount of vinyl of 15 wt % to 18 wt %.

5. The asphalt modifier of claim 1, wherein the second conjugated diene block has a peak molecular weight (Mp) of 10,000 g/mol to 22,000 g/mol and an amount of vinyl of 30 wt % to 33 wt %.

6. The asphalt modifier of claim 1, wherein a total amount of vinyl included in the first and second conjugated diene blocks is in a range of 15 wt % to 30 wt % based on a total weight of the first and second conjugated diene blocks.

7. The asphalt modifier of claim 1, wherein the first and second conjugated diene blocks each independently comprise a repeating unit structure which is derived from at least one compound selected from the group consisting of 1,3-butadiene, 2,3-dimethyl-1,3-butadiene, and 2-phenyl-1,3-butadiene.

8. The asphalt modifier of claim 1, wherein the residual group of the coupling agent is a linear or branched alkylene group having 1 to 12 carbon atoms which includes at least one functional group selected from the group consisting of a vinyl group, an ether group, a carbonyl group, a carboxyl group, an ester group, a silanol group, and a silyl group.

9. The asphalt modifier of claim 1, wherein the vinyl aromatic hydrocarbon-conjugated diene block copolymer has a coupling efficiency of 50% to 90%.

10. The asphalt modifier of claim 1, wherein the vinyl aromatic hydrocarbon-conjugated diene block copolymer has a peak molecular weight (Mp) of 50,000 g/mol to 200,000 g/mol.

11. The asphalt modifier of claim 1, wherein the vinyl aromatic hydrocarbon-conjugated diene block copolymer has a toluene solution viscosity (5% TSV) at 25° C. of 9 cSt to 15 cSt.

12. The asphalt modifier of claim 1, further comprising a vinyl aromatic hydrocarbon-conjugated diene block copolymer of Formula 3:

(A-B-C)-D-(H)$_{n-1}$      [Formula 3]

in Formula 3,
A represents a vinyl aromatic hydrocarbon block having a peak molecular weight (Mp) of 10,000 g/mol to 35,000 g/mol,
B represents a first conjugated diene block having a peak molecular weight (Mp) of 16,000 g/mol to 30,000 g/mol and an amount of vinyl of 10 wt % to 20 wt %,
C represents a second conjugated diene block having a peak molecular weight (Mp) of 10,000 g/mol to 24,000 g/mol and an amount of vinyl of greater than 20 wt % and equal to or less than 34 wt %,
D represents a residual group of a coupling agent, and
n is an integer between 2 and 4.

13. A method for preparing an asphalt modifier comprising a vinyl aromatic hydrocarbon-conjugated diene block copolymer of Formula 1, the method comprising:
preparing a first mixed solution comprising a polymer for forming a vinyl aromatic hydrocarbon block by primary polymerization of a vinyl aromatic hydrocarbon-based monomer using a polymerization initiator in a hydrocarbon-based solvent;
preparing a second mixed solution comprising a vinyl aromatic hydrocarbon-first conjugated diene diblock copolymer by adding a conjugated diene to the first mixed solution and performing secondary polymerization;
preparing a third mixed solution comprising a vinyl aromatic hydrocarbon-first conjugated diene-second conjugated diene triblock copolymer by adding a Lewis base and a conjugated diene to the second mixed solution and performing third polymerization; and
performing a coupling reaction by adding a coupling agent to the third mixed solution:

(A-B-C)$_n$-D      [Formula 1]

in Formula 1,
A represents a vinyl aromatic hydrocarbon block having a peak molecular weight (Mp) of 10,000 g/mol to 35,000 g/mol,
B represents a first conjugated diene block having a peak molecular weight (Mp) of 16,000 g/mol to 30,000 g/mol and an amount of vinyl of 10 wt % to 20 wt %,
C represents a second conjugated diene block having a peak molecular weight (Mp) of 10,000 g/mol to 24,000 g/mol and an amount of vinyl of greater than 20 wt % and equal to or less than 34 wt %,
D represents a residual group of a coupling agent, and
n is an integer between 2 and 4.

14. The method of claim 13, wherein the polymerization initiator comprises one selected from the group consisting of n-butyllithium, sec-butyllithium, tert-butyllithium, methyllithium, ethyllithium, isopropyllithium, cyclohexyllithium, allyllithium, vinyllithium, phenyllithium, and benzyllithium, or a mixture of two or more thereof.

15. The method of claim 13, wherein the Lewis base comprises one selected from the group consisting of ditetrahydrofurylpropane, tetrahydrofurane, tetramethylenediamine, and tetramethylethylenediamine, or a mixture of two or more thereof.

16. The method of claim 13, wherein the Lewis base is added at a temperature of 40° C. to 100° C. and a pressure of 0.1 bar to 3 bar.

17. The method of claim 13, wherein the coupling agent comprises one selected from the group consisting of divinylbenzene, diethyl adipate, glycidyl methacrylate, dimethyldichlorosilane, methyldichlorosilane, methoxysilane, glycidoxy trimethoxysilane, oxy dipropyl-bis(trimethoxysilane), α,ω-bis(2-trichlorosilylethyl)polydimethylsiloxane, and polyketone, or a mixture of two or more thereof.

18. An asphalt composition comprising:
the asphalt modifier of claim 1;
an asphalt; and
a crosslinking agent.

19. The asphalt composition of claim 18, comprising 1 wt % to 10 wt % of the asphalt modifier, 87 wt % to 98.95 wt % of the asphalt, and 0.05 wt % to 3 wt % of the crosslinking agent based on a total weight of the asphalt composition.

20. The asphalt composition of claim 18, wherein the asphalt comprises 1 wt % to 40 wt % of asphaltene based on a total weight of the asphalt composition.

* * * * *